(12) United States Patent  (10) Patent No.: US 8,411,448 B2
Shi et al.  (45) Date of Patent: Apr. 2, 2013

(54) SECURITY PROTECTION DEVICE AND METHOD

(75) Inventors: Shuxian Shi, Shenzen (CN); Hongtao Sun, Shenzen (CN)

(73) Assignee: PAX Computer Technology, Co., Ltd., Shenzhen, Guangdong (CN)

( * ) Notice: Subject to any disclaimer, the term of this patent is extended or adjusted under 35 U.S.C. 154(b) by 298 days.

(21) Appl. No.: 12/875,810

(22) Filed: Sep. 3, 2010

(65) Prior Publication Data

US 2011/0048756 A1 Mar. 3, 2011

(30) Foreign Application Priority Data

Sep. 3, 2009 (CN) ...................... 2009 2 0162831 U

(51) Int. Cl.
*H05K 1/00* (2006.01)
(52) U.S. Cl. ........ 361/748; 361/730; 361/752; 361/760; 361/761; 257/678; 257/698; 257/731; 713/194; 174/50
(58) Field of Classification Search .................. 257/678, 257/698, 731; 713/194; 361/760, 752, 761, 361/748, 730; 174/50; 340/541
See application file for complete search history.

(56) References Cited

U.S. PATENT DOCUMENTS

| | | | | |
|---|---|---|---|---|
| 4,811,288 A * | 3/1989 | Kleijne et al. ................. | 365/52 |
| 5,159,629 A * | 10/1992 | Double et al. ................. | 713/194 |
| 6,512,454 B2 * | 1/2003 | Miglioli et al. ............... | 340/541 |
| 6,853,093 B2 * | 2/2005 | Cohen et al. .................. | 257/678 |
| 7,054,162 B2 * | 5/2006 | Benson et al. ................. | 361/760 |
| 7,065,656 B2 * | 6/2006 | Schwenck et al. ............ | 713/194 |
| 2010/0024046 A1 * | 1/2010 | Johnson et al. ................. | 726/34 |

* cited by examiner

*Primary Examiner* — Courtney Smith
*Assistant Examiner* — James Wu
(74) *Attorney, Agent, or Firm* — Finnegan, Henderson, Farabow, Garrett & Dunner LLP

(57) ABSTRACT

A security protection device includes a cover circuit board, at least one inner wiring layer being included within the cover circuit board. The device also includes a base circuit board, at least one inner wiring layer being included within the base circuit board. The device further includes a security frame between the base circuit board and the cover circuit board, at least one electrically conductive wire being wound and included within the security frame to form at least one winding protection layer around sides of the security frame. The cover circuit board, the security frame, and the base circuit board form an enclosure enclosing a security zone, and the at least one inner wiring layer within the cover circuit board, the at least one inner wiring layer within the base circuit board, and the at least one electrically conductive wire within the security frame are connectable to a security mechanism configured to detect an intrusion into the security zone.

14 Claims, 6 Drawing Sheets

SECURITY PROTECTION DEVICE AND METHOD

CROSS REFERENCE TO RELATED PATENTS

This application claims the priority and benefit of Chinese Patent Application No. 200920162831.3, filed on Sep. 3, 2009, titled "A Security Protection Device," the entire contents of which are incorporated herein by reference.

TECHNICAL FIELD

The present disclosure relates to methods and devices for electronic circuit protection and, more specifically, relates to protecting data stored in electronic components on a circuit board.

BACKGROUND

Nowadays, electronic circuits may store sensitive data such as banking information, passwords, registration codes, and so forth, which may be stolen by unauthorized attackers. Therefore, protection of sensitive data has gained increasing attention, and various forms of security protection devices and methods have emerged. For example, an anti-tampering method for protecting sensitive data uses several printed circuit boards to form an anti-tampering enclosure to enclose a protected region containing the sensitive data. The anti-tampering enclosure includes a base printed circuit board, which is peripherally enclosed by one or more additional printed circuit boards and is covered by yet another printed circuit board. The printed circuit boards included in the anti-tampering enclosure are configured as a multilayered structure, such that the enclosure has gaps between the layers. As a result, an attacker may be

CROSS REFERENCE TO RELATED PATENTS

This application claims the priority and benefit of Chinese Patent Application No. 200920162831.3, filed on Sep. 3, 2009, titled "A Security Protection Device," the entire contents of which are incorporated herein by reference.

TECHNICAL FIELD

The present disclosure relates to methods and devices for electronic circuit protection and, more specifically, relates to protecting data stored in electronic components on a circuit board.

BACKGROUND

Nowadays, electronic circuits may store sensitive data such as banking information, passwords, registration codes, and so forth, which may be stolen by unauthorized attackers. Therefore, protection of sensitive data has gained increasing attention, and various forms of security protection devices and methods have emerged. For example, an anti-tampering method for protecting sensitive data uses several printed circuit boards to form an anti-tampering enclosure to enclose a protected region containing the sensitive data. The anti-tampering enclosure includes a base printed circuit board, which is peripherally enclosed by one or more additional printed circuit boards and is covered by yet another printed circuit board. The printed circuit boards included in the anti-tampering enclosure are configured as a multilayered structure, such that the enclosure has gaps between the layers. As a result, an attacker may be able to gain access to the protected region through the gaps, and thus security risks still remain.

SUMMARY

The present disclosure includes an exemplary security protection device including a cover circuit board, at least one inner wiring layer being included within the cover circuit board. The device also includes a base circuit board, at least one inner wiring layer being included within the base circuit board. The device further includes a security frame between the base circuit board and the cover circuit board, at least one electrically conductive wire being wound and included within the security frame to form at least one winding protection layer around sides of the security frame. The cover circuit board, the security frame, and the base circuit board form an enclosure enclosing a security zone, and the at least one inner wiring layer within the cover circuit board, the at least one inner wiring layer within the base circuit board, and the at least one electrically conductive wire within the security frame are connectable to a security mechanism configured to detect an intrusion into the security zone.

It is to be understood that both the foregoing general description and the following detailed description are exemplary and explanatory only and are not restrictive of the invention, as claimed.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Exemplary embodiments disclosed herein are directed to methods and devices for protection of data stored in an electronic component mounted on a circuit board against attacks, including against attacks from a side direction. Security protection devices disclosed herein are configured to overcome one or more of the above-mentioned deficiencies of existing anti-tampering technologies. Security protection devices consistent with some embodiments include, among other things, a base circuit board, a cover circuit board, and a security frame having at least one winding wire embedded therein. The security frame is located between the base circuit board and the cover circuit board, and is combined with the cover circuit board and the base circuit board to form an enclosure enclosing a security zone. In some embodiments, the security frame includes, among other things, at least one electrically conductive wire wound around an inner frame and coupled to a security mechanism configured to detect an intrusion.

Figure 1B:
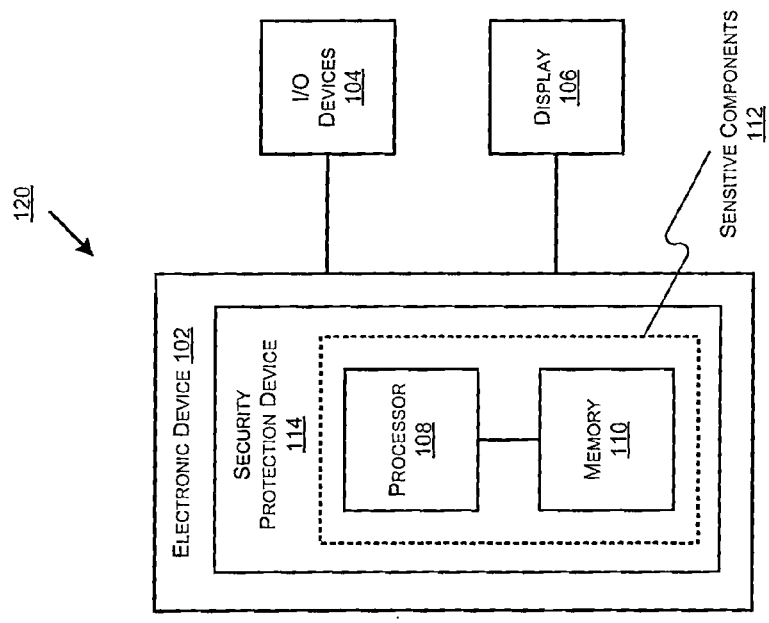
FIG. 1B illustrates a block diagram of another embodiment of an exemplary system.
Figure 1A:
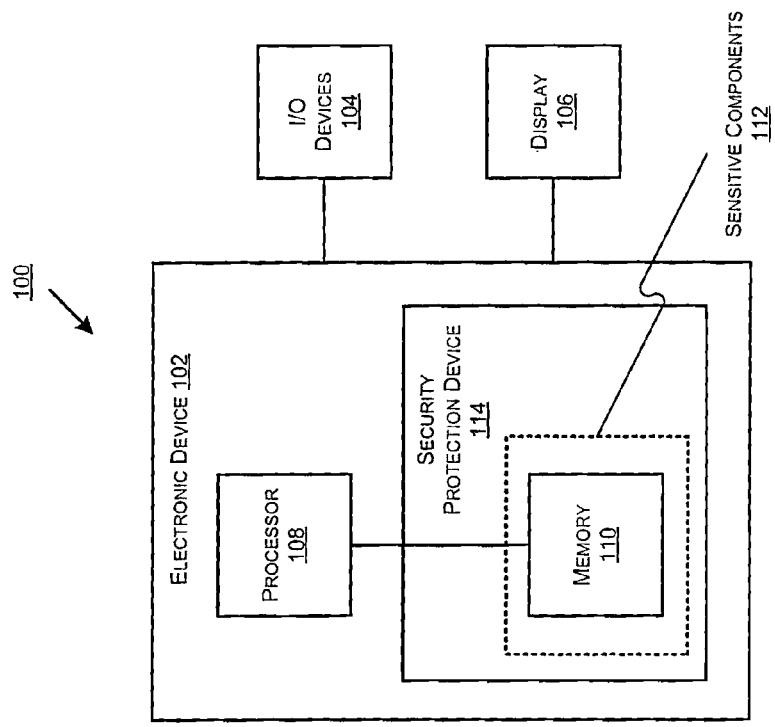
FIG. 1A illustrates a block diagram of an embodiment of an exemplary system.

FIG. 1A illustrates a block diagram of an embodiment of an exemplary system 100. Exemplary system 100 may be any type of electronic system that receives, processes, and/or stores data. Exemplary system 100 may include, among other things, an electronic device 102, one or more input/output (I/O) devices 104, and a display 106. It is understood that devices shown in FIG. 1A are for illustrative purposes only. Certain devices may be removed or combined and other devices may be added.

Electronic device 102 can be a hardware device such as a point-of-sale (POS) terminal, an electronic cash register, a computer, a PDA, a cell phone, a laptop, a desktop, or any other electronic device that is capable of receiving data from an I/O device or a data network, processing, and/or storing the received data. Electronic device 102 can include software applications to communicate with and receive data from an I/O device (e.g., I/O devices 104), or from a data server, an enterprise server, or any other type of computer server through, in some embodiments, a data network. In some embodiments, electronic device 102 can be a POS terminal, for example, a countertop POS terminal or a mobile/portable POS terminal, which can capture and process selling and payment information and manage sale transactions. For example, a POS terminal can record and track customer orders, process credit and debit card payments, connect to other systems in a network, and manage inventories.

In some embodiments, electronic device 102 can also include a processor 108 and a memory 110. Processor 108 can be a hardware device that is capable of executing instructions of computer programs and carrying out functions of electronic device 102, e.g., receiving, processing, and/or storing data. Processor 108 can be, for example, a central processing unit (CPU), a microprocessor, a single processor, or multiple processors.

Memory 110 of electronic device 102 can be a storage device such as a volatile or non-volatile memory, a random-access memory (RAM), a dynamic RAM (DRAM), a static RAM (SRAM), a read-only memory (ROM), an erasable programmable read only memory (EPROM), an electrically erasable programmable read-only memory (EEPROM), a flash memory, or any other storage device capable of storing data processed by processor 108 and data sent to or received from an I/O device, e.g., I/O devices 104.

In some embodiments, sensitive components 112 of electronic device 102, e.g., memory 110, temporarily or permanently store data and are enclosed within a security protection device 114 that is configured to protect the data from attacks or tampering. Security protection device 114 will be further described below.

Electronic device 102 may be coupled to one or more I/O devices 104. I/O devices 104 can be any hardware devices capable of passing information to or receiving data from processor 108. By way of example only, I/O devices 104 may be optical and bar code scanners, magnetic card readers, keyboards, network cards coupled to a data network, or any combination of these devices that can capture and/or receive information. Some of the captured and/or received information may be sensitive data, for example, banking information, passwords, registration codes, and etc., and may be processed by or stored in electronic components that are enclosed in security protection device 114. I/O devices 104 can be located within electronic device 102, local to electronic device 102, or remote from electronic device 102.

Electronic device 102 may also be coupled to display 106. Display 106 is a display device for displaying a graphical user interface, instruction/feedback, or other information for facilitating interface with electronic device 102. For example, display 106 can be provided as a television set, a computer monitor, a projector, a display panel, and any other display device. Display 106 can be located within electronic device 102, local to electronic device 102, or remote from electronic device 102.

FIG. 1B illustrates a block diagram of another embodiment of an exemplary system 120. In system 120, sensitive components 112 of electronic device 102, include processor 108, memory 110, and other electronic components that process data, and/or temporarily or permanently store data. Sensitive components 112 including processor 108 and memory 110 are enclosed within security protection device 114. The features and configuration of system 120 are otherwise similar to or the same as those described above and shown in FIG. 1A with respect to system 100.

Figure 2:
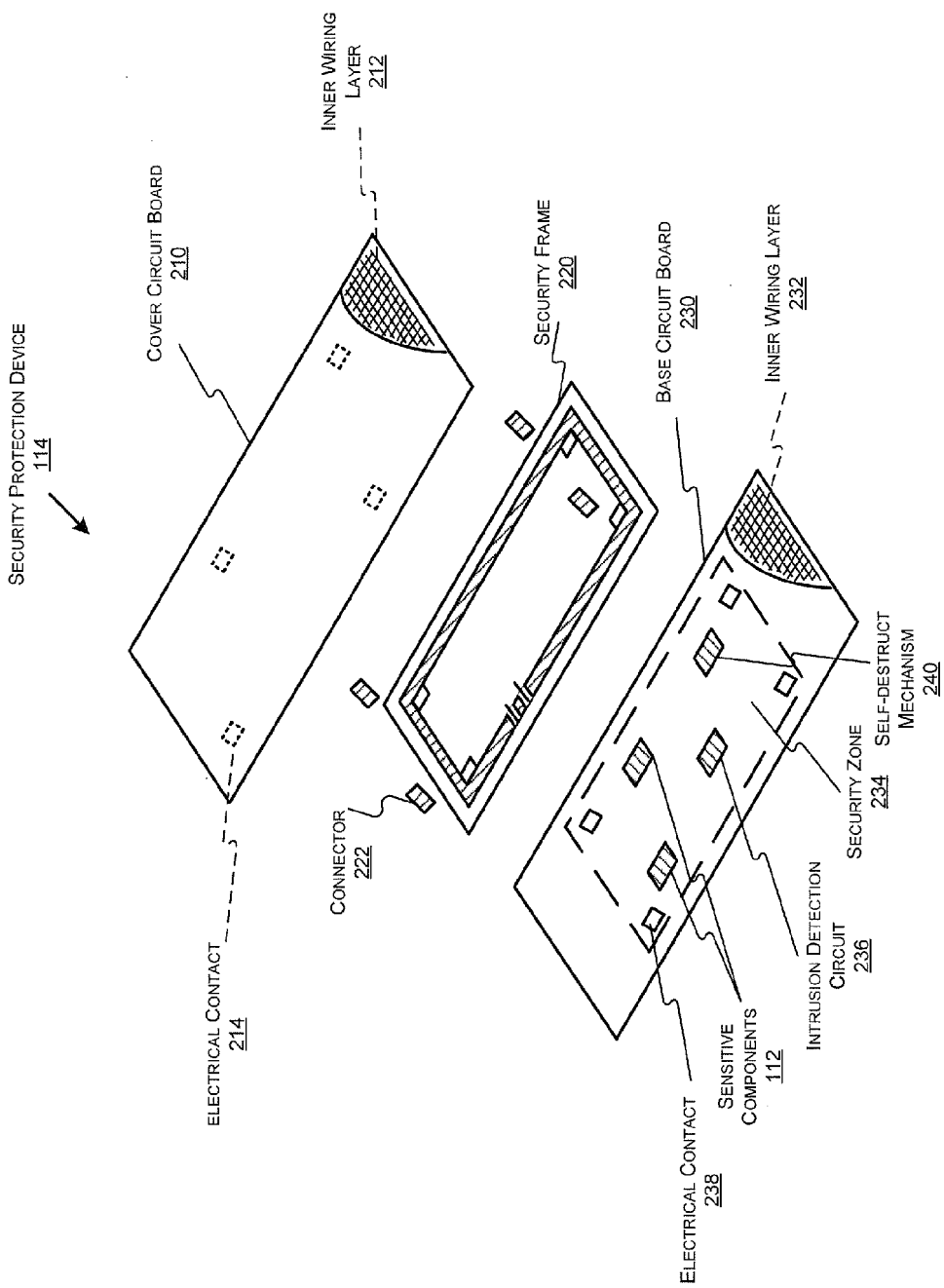
FIG. 2 is an exploded view schematic diagram illustrating an exemplary structure of the security protection device in the exemplary systems of FIGS. 1A and 1B.

FIG. 2 illustrates an exploded view schematic diagram of an exemplary structure of security protection device 114 in exemplary systems 100 and 120 of FIGS. 1A and 1B, respectively. Security protection device 114 is configured to protect sensitive data stored in one or more electronic components mounted on a circuit board from attacks or tampering. Security protection device 114 includes a cover circuit board 210, a security frame 220, and a base circuit board 230. The various illustrated components of exemplary security protection device 114 may be provided as discrete components, be combined, or be arranged in different configurations. Also, additional components may be included, and different materials may be used.

With reference to FIG. 2, cover circuit board 210 and base circuit board 230 can be any type of circuit board for mechanically supporting and electrically connecting electronic components using conductive pathways, and can have one or more wiring layers connecting electronic components. For example, cover circuit board 210 and base circuit board 230 can be any type of printed circuit board. Cover circuit board 210 and base circuit board 230 can each have one or more electronic components mounted thereon. For example, electronic components mounted on base circuit board 230 or cover circuit board 210 include the one or more sensitive components 112 for processing and/or temporarily or permanently storing sensitive data mounted within a security zone 234. Base circuit board 230 or cover circuit board 210 may also include a security mechanism for detecting an intrusion and automatically destroying or erasing the sensitive data.

The security mechanism can include, among other things, one or more intrusion detection circuits, e.g., one or more intrusion detection circuits 236, to detect an intrusion by an attacker, and a self-destruct mechanism 240 to automatically destroy or erase the sensitive data if activated. In some embodiments, intrusion detection circuit 236 includes self-destruct mechanism 240. In some embodiments, some components of the security mechanism can be located inside or outside of security zone 234. In some embodiments, some components of the security mechanism can be located on or off base circuit board 230. Further, in some embodiments, the security mechanism or some components of the security mechanism can be mounted on cover circuit board 210.

Cover circuit board 210 and base circuit board 230 may include one or more electronically conductive inner wiring layers 212 and 232, respectively. The one or more electronically conductive inner wiring layers 212 and 232 can form one or more protection layers and/or extend over the entire area of cover circuit board 210 and base circuit board 230, respectively. Inner wiring layers 212 and 232 are connected to one or more intrusion detection circuits 236 by, for example, welding, patching, or mechanically connecting. Either or both of inner wiring layers 212 and 232 may include, for example, layered wire meshes (e.g., one or more mesh layers). Any known wiring methods may be used. In some embodiments, for example, either or both of inner wiring layers 212 and 232 can include two parallel windings, one connecting to a high-level voltage, and the other one connecting to a low-level voltage. In some embodiments, either or both of inner wiring layers 212 and 232 may include one or more winding wires. Further, cover circuit board 210 may include one or more electrical contacts 214 on its underside for electrically connecting conductive components to inner wiring layer 212. Base circuit board 230 may also include one or more electrical contacts 238 on its front side for electrically connecting conductive components to the one or more intrusion detection circuits 236 mounted on base circuit board 230 directly or indirectly (e.g., through inner wiring layer 232 or a separate conductive path).

Security frame 220 can be any type of material that has one or more of a high melting point, chemical resistance, and drill resistance. For example, security frame 220 can be made of thermosetting plastic, metal, or bakelite. Security frame 220 is located between cover circuit board 210 and base circuit board 230, and has a wall-like shape configured to surround security zone 234. Also, security frame 220 can be combined with cover circuit board 210 and base circuit board 230 to form an enclosure enclosing security zone 234 as an enclosed space. Security zone 234 is thus sandwiched between cover circuit board 210 and base circuit board 230, and surrounded by security frame 220. Moreover, security frame 220 may have one or more electrically conductive winding wires (not shown in FIG. 2) embedded therein and connected to one or more intrusion detection circuits 236.

In some embodiments, a plurality of connectors (pins) 222 are mounted in and pass through security frame 220. In some embodiments, connectors 222 connect and, optionally, attach, cover circuit board 210 to base circuit board 230 together. Connectors 222 can be any type of electrically conductive material, and can directly or indirectly electrically connect inner wiring layer 212 of cover circuit board 210 to one or more intrusion detection circuits 236. In some embodiments, one or more intrusion detection circuits 236 may be mounted on cover circuit board 210, and connectors 222 can directly or indirectly electrically connect inner wiring layer 232 of base circuit board to the one or more intrusion detection circuits 236. Connectors 222 can be, for example, but are not limited to, a soft conductive material such as a conductive rubber or a hard conductive material such as a board-to-board connector. In some embodiments, connectors 222 can electrically connect inner wiring layer 212 of cover circuit board 210 to inner wiring layer 232 of base circuit board 230, through electrical contacts 214 and 238. In some embodiments, for example, connectors 222 connect to one or more intrusion detection circuits 236 mounted on base circuit board 230 through inner wiring layer 232. In some embodiments, each of connectors 222 and electrical contacts 214 and 238 can be configured to have a multi-layered structure including a plurality of conductive layers and a plurality of insulation layers. In the multi-layered structure, each conductive layer is separated by an insulation layer from another conductive layer, such that each of connectors 222 and electrical contacts 214 and 238 can be configured to be pathways for one or more electrical connections. For example, in the multi-layered structure, some conductive layers can be configured to receive output signals from an intrusion detection circuit and other conductive layers can be configured to transmit input signals to the intrusion detection circuit.

Although not shown in FIG. 2, in some embodiments, security protection device 114 includes an additional set of cover circuit board 210, security frame 220, and connectors 222. Additional cover circuit board 210 can be combined with additional security frame 220 to form an enclosure covering a back side or underside of security zone 234. The enclosure can be mounted on a back side or underside of base circuit board 230. Additional connectors 222 can electrically connect inner wiring layer 212 of additional cover circuit board 210 to inner wiring layer 232 of base circuit board 230. In some embodiments, for example, additional connectors 222 connect to one or more intrusion detection circuits 236 mounted on base circuit board 230 through inner wiring layer 232. The additional set of cover circuit board 210, security frame 220, and connectors 222 can be configured similarly to the configuration described above and shown in FIG. 2, and can provide additional security protection to the sensitive data from the back side or underside of security zone 234.

The illustrated components of security protection device 114 can be engaged or fastened together by any means. For example, in some embodiments, the components can be fixed together by screws.

Figure 3:
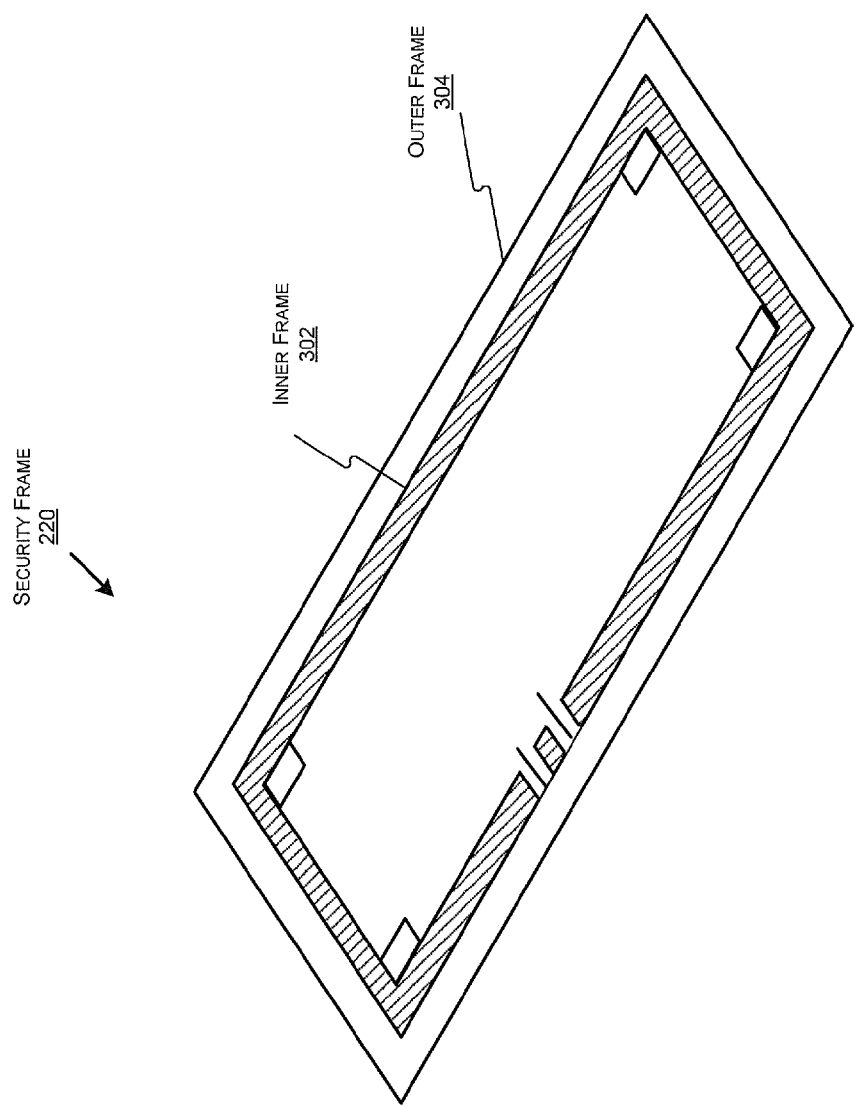
FIG. 3 is a schematic diagram illustrating an exemplary structure of a security frame shown in FIG. 2.

FIG. 3 illustrates a schematic diagram of an exemplary structure of security frame 220 of security protection device 114 in FIG. 2. Security frame 220 may include, among other things, an inner frame 302, one or more winding wires (not shown in FIG. 3) embedded inside security frame 220, and an outer frame 304. The illustrated configuration of security frame 220 is exemplary only, and the various illustrated components may be provided as discrete components, be combined, or be arranged in different configurations. Also, additional components may be included, and different materials may be used.

Inner frame 302 and outer frame 304 can be any type of material that has one or more of a high melting point, chemical resistance, and drill resistance. For example, frames 302 and 304 can be made of thermosetting plastic, metal, or bakelite. In some embodiments, outer frame 304 may be composed of a type of material that has one or more of a high melting point, chemical resistance, and drill resistance, while inner frame 302 is not so composed. For example, outer frame 304 can be made of thermosetting plastic or bakelite, while inner frame 302 can be made of acrylonitrile butadiene styrene (ABS) plastic, thermosetting plastic, metal, bakelite, or other material. Also, each of frames 302 and 304 can be fabricated/manufactured by any process and/or method, for example, by injection molding. Inner frame 302 can be configured to form a wall to surround security zone 234 shown in FIG. 2. One or more winding wires (not shown in FIG. 3) can be wound around inner frame 302. After winding the one or more wires, outer frame 304 can be fabricated to surround inner frame 302 having the one or more winding wires wound around it. In some embodiments, outer frame 304 and inner frame 302 with the one or more winding wires can be combined together by, for example, injection molding, to form a solidified whole. As a result of these various fabrication methods, the winding wire or wires are contained or embedded between inner frame 302 and outer frame 304.

Figure 4:
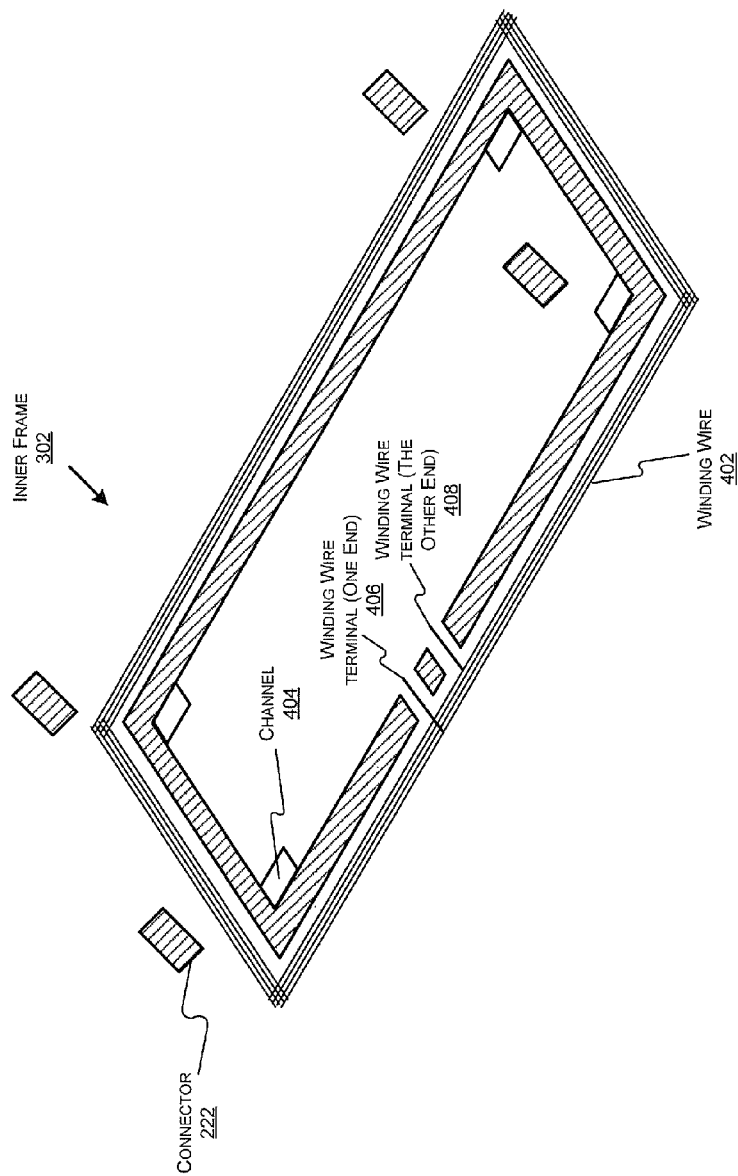
FIG. 4 is a schematic diagram illustrating an exemplary structure of an inner frame of the security frame of FIGS. 2 and 3.

FIG. 4 illustrates a schematic diagram of an exemplary structure of inner frame 302 of security frame 220 of FIGS. 2 and 3. In some embodiments, inner frame 302 has one or more winding wires 402 wound around it. In some embodiments, inner frame 302 can be configured to have a plurality of vertical channels 404 for connectors 222 to respectively pass through. The illustrated configuration of inner frame 302 with one or more winding wires 402 is exemplary only, and the various illustrated components may be provided as discrete components, be combined, or be arranged in different configurations. Also, additional components may be included, and different materials may be used.

Winding wire 402 can be any type of electrically conductive wire and can interconnect with intrusion detection circuit 236. For example, winding wire 402 can be made of metal. Also, winding wire 402 can be an enameled wire. In some embodiments, one or more winding wires 402 can be embedded inside security frame 220 shown in FIGS. 2 and 3. In some embodiments, one or more winding wires 402 can be evenly wound around inner frame 302 and form one or more winding protection layers covering or surrounding side surfaces of inner frame 302. The one or more winding protection layers may include, for example, layered wire meshes (e.g., one or more mesh layers). In some embodiments, the one or more winding protection layers extend over the entire area of the side surfaces of inner frame 302. The windings can be parallel windings, vertical windings, or cross windings. In some embodiments, if more than one winding wire 402 is used, the windings can be wound evenly around inner frame 302 at the same time during production. In addition, in some embodiments, one or more terminals (endpoints) 406 and 408 of winding wire 402 may be located on an inner side of inner frame 302, and can directly or indirectly connect to intrusion detection circuit 236 by any means. For example, winding wire terminals 406 and 408 can connect to intrusion detection circuit 236 by welding, patching, or mechanically connecting.

In some embodiments, inner frame 302 can be configured to have a plurality of vertical channels 404. Each of channels 404 in inner frame 302 can be any type of opening configured for connector 222 to pass therethrough. Each of connectors 222 can pass through each of channels 404, respectively, to connect to one or more intrusion detection circuits 236. In some embodiments, inner frame 302 may not include channels 404, and connector 222 may be, for example, a board-to-board connector, which does not need to be mounted in or pass through inner frame 302.

Figure 5:
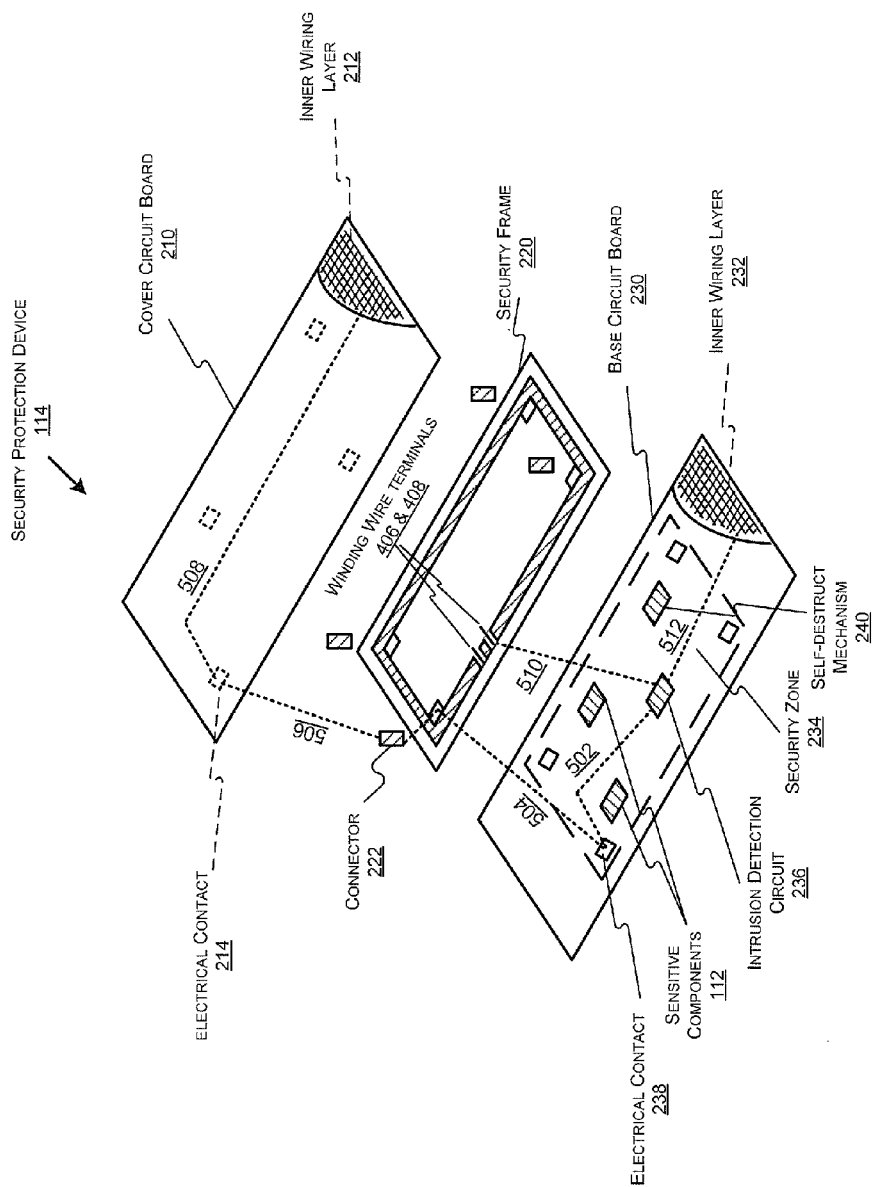
FIG. 5 is a functional diagram illustrating an exemplary configuration of electrical connections for the security protection device of FIG. 2.

FIG. 5 is a functional diagram illustrating an exemplary configuration of electrical connections for security protection device 114 of FIG. 2. Without departing from the exemplary embodiments, the exemplary configuration can be altered to delete electrical connections, change routes of electrical connections, or include additional electrical connections. In addition, the dotted lines in FIG. 5 only illustrate exemplary connectivity between components. Moreover, each dotted line may represent several actual connections including, for example, one connection coupled to a high-level voltage (or an output signal), and another connection coupled to a low-level voltage (or an input signal). One or more dotted lines may form a closed circuit. Further, regarding a plurality of same/similar components, e.g., one or more inner wiring layers 212 and 232, one or more winding wires in each of inner wiring layers 212 and 232, a plurality of connectors 222, one or more winding wires 402 embedded in security frame 220, one or more intrusion detection circuits 236, and etc., of security protection device 114, although only configurations of electrical connections for one such component are shown, similar configurations can be made to other same/similar components.

With reference to FIG. 5, connector 222, whether mounted to pass through channel 404 or separately mounted as a board-to-board connector, connects inner wiring layer 212 of cover circuit board 210 to intrusion detection circuit 236 mounted on base circuit board 230. More specifically, on base circuit board 230, intrusion detection circuit 236 connects (502) to electrical contact 238, which connects (504) connector 222. In some embodiments, intrusion detection circuit 236 can connect (502) to electrical contact 238 through inner wiring layer 232. In some embodiments, intrusion detection circuit 236 can connect (502) to electrical contact 238 through one or more wires buried/embedded within base circuit board 230. On cover circuit board 210, electrical contact 214 connects (506) connector 222 and interconnects (508) with terminals (endpoints) of inner wiring layer 212.

Inner wiring layer 212, electrical contact 214, connector 222, electrical contact 238, intrusion detection circuit 236, and connections 502-508 can form a closed circuit. If any part of the connections/components is disconnected or shorted, an open circuit or a short circuit can be formed, and the above described security mechanism can be triggered, e.g., triggering intrusion detection circuit 236, and thus activating self-destruct mechanism 240 to destroy and/or erase the data stored in electronic components, e.g., sensitive components 112, mounted within security zone 234.

Cover circuit board 210 is configured to protect the electronic components mounted within security zone 234 against attacks from the top of security protection device 114. When receiving a physical attack to cover circuit board 210, a winding wire of inner wiring layer 212 may be disconnected or shorted, causing an open circuit or a short circuit, and thus triggering the security mechanism.

Each connector 222 is configured to protect the electronic components mounted within security zone 234 against attacks attempting to uncover or loosen cover circuit board 210 and/or base circuit board 230 of security protection device 114. Each connector 222 not only connects signals between cover circuit board 210 and base circuit board 230, but also acts as a pressure sensor. If an attacker uncovers either cover circuit board 210 or base circuit board 230, connector 222 is loosened, causing an open/short circuit, and thus triggering the security mechanism.

With reference to FIG. 5, intrusion detection circuit 236 connects (510) to terminals 406 and 408 of winding wire 402 (not shown in FIG. 5) embedded in security frame 220. Intrusion detection circuit 236, terminals 406 and 408, winding wire 402, and connection 510 form a closed circuit. In some embodiments, winding wire 402 connects inner wiring layer 212 of cover circuit board 210 to intrusion detection circuit 236 directly or indirectly (e.g., through one of connectors 222), and forms a closed circuit. In any of the above described closed circuits, if any part of the connection/components is disconnected or shorted, the security mechanism is triggered to destroy and/or erase the data stored in the electronic components, e.g., sensitive components 112, mounted within security zone 234.

Winding wire 402 wound around inner frame 302 of security frame 220, is configured to protect the electronic components mounted within security zone 234 against attacks from a side direction of security protection device 114. When receiving a physical attack to security frame 220 from a side direction, winding wire 402 may be disconnected or shorted, causing an open circuit or a short circuit, and thus trigger the security mechanism.

In addition, winding wire 402 can protect against attacks to any of connectors 222 from a side direction. Because each of connectors 222 is located within security zone 234 or in an inner portion—e.g., channel 404 located inside inner frame 302 as shown in FIG. 4—of inner frame 302 of security frame 220, each connector 222 can be protected by winding wire 402 wound around inner frame 302. If an attacker attacks any of connectors 222 from a side direction, winding wire 402 may be disconnected or shorted, causing an open circuit or a short circuit, and thus trigger the security mechanism.

Intrusion detection circuit 236 connects (512) to inner wiring layer 232 of base circuit board 230. Intrusion detection circuit 236, inner wiring layer 232, and connection 512 can form a closed circuit. If any part of the connection/components is disconnected or shorted, the security mechanism is triggered to destroy and/or erase the data stored in the electronic components, e.g., sensitive components 112, mounted within security zone 234.

Base circuit board 230 is configured to protect the electronic components mounted within security zone 234 against attacks from the bottom of security protection device 114. When receiving a physical attack to base circuit board 230, the winding wire of inner wiring layer 232 may be disconnected or shorted, causing an open circuit or a short circuit, and thus trigger the security mechanism.

Figure 6:
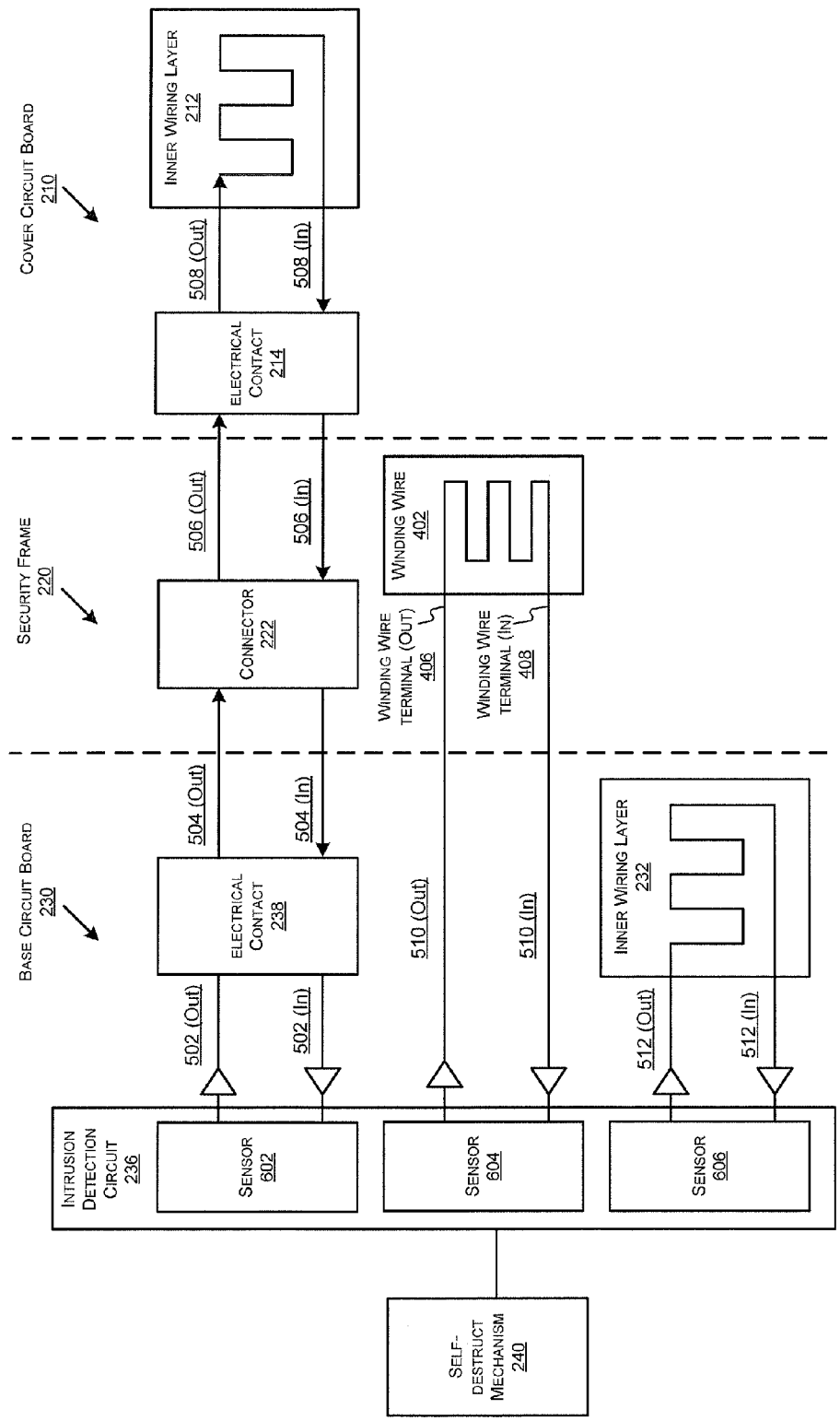
FIG. 6 is a functional block diagram of an exemplary configuration of the electrical connections shown in FIG. 5.

FIG. 6 is a functional block diagram of an exemplary configuration of the electrical connections shown in FIG. 5. The illustrated configuration of intrusion detection circuit 236 is exemplary only, and its various illustrated components may be provided as discrete components, be combined, or be arranged in different configurations. Also, additional components may be included, and different materials may be used. Moreover, the exemplary configuration of electrical connections can be altered to delete electrical connections, change routes of electrical connections, or include additional electrical connections. Further, a reference number followed by an input or output indicator (e.g., "in" and "out") for each electrical connection corresponds to an exemplary connection in FIG. 5 with the same reference number.

With reference to FIG. 6, intrusion detection circuit 236 may include a plurality of security sensors, e.g., sensors 602, 604, and 606. Each of the security sensors may include, but is not limited to, for example, one or more temperature sensors for detecting temperature changes relative to a predefined range, one or more voltage sensors for detecting electrical voltage changes relative to a predefined range, and/or one or more tamper sensors for detecting electrical resistance changes relative to a predefined range. In some embodiments, the security mechanism includes more than one intrusion detection circuits 236, and each intrusion detection circuit 236 is a security sensor. Each of the security sensors may include an output port (pin) and/or an input port (pin) connecting to one or more components of security protection device 114 to form a closed circuit. By such connections, each of sensors 602, 604, and 606 is configured to monitor the connection(s) and detect an intrusion by detecting a disconnected or shorted circuit and/or detecting, e.g., temperature, voltage, and/or resistance changes that are outside the predefined ranges. Intrusion detection circuit 236 may be coupled to or include self-destruct mechanism 240 for destroying and/or erasing data stored in electronic components, e.g., sensitive components 112, mounted within security zone 234, upon detecting an intrusion.

For example, sensor 602 of intrusion detection circuit 236 sends (502-out) a random signal, e.g., an arbitrary pulse sequence, on its output port. The signal travels to (502-out) electrical contact 238 on base circuit board 230, to (504-out) connector 222 passing through security frame 220, to (506-out) electrical contact 214 on cover circuit board 210, and to a terminal of inner wiring layer 212 of cover circuit board 210. The signal is outputted from inner wiring layer 212 through another terminal, continues to (508-in) electrical contact 214, to (506-in) connector 222, and to (504-in) electrical contact 238. The signal returns (502-in) to the input port of sensor 602. In some embodiments, connector 222 connects to sensor 602 through inner wiring layer 232 of base circuit board 230, and the return or input signal travels along the connection route accordingly.

As previously described, each of connector 222 and electrical contacts 214 and 238 can be configured to have a multi-layered structure. One of the conductive layers of the multi-layered structure serves as an input port for receiving an output signal from a sensor (e.g., sensor 602) of intrusion detection circuit 236, while another one of the conductive layers serves as an output port for passing an input signal to the sensor.

Sensor 602 monitors the signal sent and/or the signal received. When the input value (e.g., a temperature value, a voltage level, or a resistance value) is not equal to the output value or a difference between the input value and the output value is outside the predefined range, a security interrupt is generated, and self-destruct mechanism 240 is triggered to destroy and/or erase data stored in electronic components mounted within security zone 234. For example, when receiving a physical attack to cover circuit board 210, a winding wire within circuit board 210 may be disconnected or shorted, causing a change in a voltage signal level or an electrical resistance value, and thus triggering self-destruct mechanism 240. Also, when either cover circuit board 210 or base circuit board 230 is uncovered, connector 222 may be loosened to create an open/short circuit, causing a change in a voltage signal level or an electrical resistance value, and thus triggering self-destruct mechanism 240.

Sensor 604 of intrusion detection circuit 236 sends (510-out) a random signal on its output port. The signal travels to (510-out) a terminal (e.g., terminal 406) of winding wire 402 embedded in security frame 220, is outputted on another terminal (e.g., terminal 408) of winding wire 402, and returns to (510-in) the input port of sensor 604. In some embodiments, winding wire 402 connects inner wiring layer 212 of cover circuit board 210 to intrusion detection circuit 236 directly or indirectly (e.g., through one of connectors 222), and the signal sent by sensor 604 travels along the connections similarly to those described above.

Sensor 604 monitors the signal sent and/or the signal received. When the input value is not equal to the output value or a difference between the input value and the output value is outside the predefined range, a security interrupt is generated, and self-destruct mechanism 240 is triggered to destroy and/or erase data stored in electronic components mounted within security zone 234. For example, when receiving a physical attack to security frame 220 from a side direction, winding wire 402 may be disconnected or shorted, causing a change in a voltage signal level or an electrical resistance value, and thus triggering self-destruct mechanism 240.

Sensor 606 of intrusion detection circuit 236 sends (512-out) a random signal on its output port. The signal travels to (512-out) a terminal of inner wiring layer 232 of base circuit board 230, is outputted on another terminal of inner wiring layer 232, and returns to (512-in) the input port of sensor 606.

Sensor 606 monitors the signal sent and/or the signal received. When the input value is not equal to the output value or a difference between the input value and the output value is outside the predefined range, a security interrupt is generated, and self-destruct mechanism 240 is triggered to destroy and/or erase data stored in electronic components mounted within security zone 234. For example, when receiving a physical attack to base circuit board 230, a winding wire of inner wiring layer 232 may be disconnected or shorted, causing a change in a voltage signal level, and thus triggering self-destruct mechanism 240.

In some embodiments, at least one of sensors 602, 604, and 606 may be able to detect an intrusion without sending or receiving a signal to/from one of the above described connections. The at least one of sensors 602, 604, and 606 may detect an intrusion by judging information acquired from one of the above described connections, for example, by judging an electrical resistance value or a voltage value acquired from a portion of a connection to determine if the resistance or voltage value satisfies predetermined criteria.

An exemplary process for manufacturing security protection device 114 and its components illustrated in FIGS. 2-5, in accordance with embodiments disclosed above, can include the following steps: defining security zone 234 having one or more electronic components mounted therein; forming inner frame 302 based on requirements for a specific application, for example, based on a size of security zone 234; winding one or more electrically conductive winding wires 402 around inner frame 302; forming and combining outer frame 304 with inner frame 302 having winding wires 402 wound around it to form security frame 220; forming an enclosure for enclosing security zone 234 by sandwiching security frame 220 between cover circuit board 210 and base circuit board 230; electrically and mechanically connecting cover circuit board 210, base circuit board 230, and winding wires 402 to a security mechanism such as described above. Inner wiring layers 212 and 232 and winding wire 402 carry electrical currents and form one or more protection layers enclosing security zone 234 and electronic components (carrying information/data to be protected) mounted therein. Without departing from the exemplary embodiments, the exemplary manufacturing process can be altered to delete steps, change the order of steps, or include additional steps.

Security protection devices consistent with embodiments disclosed herein have advantages over existing technologies. For example, the electrically conductive wire is embedded inside the security frame of a security protection device, is wound around the inner frame, and thus forms one or more winding protection layers around sides of the security protection device. Optionally, the winding around the inner frame can be made more dense, to heighten the security relative to existing technologies that uses printed circuit boards, which have gaps between layers of circuit boards. The security protection device disclosed herein can also reduce production costs and can be manufactured using known wire winding technologies. Therefore, security protection devices consistent with embodiments disclosed herein have advantages of high security and reduced costs.

In the preceding specification, the invention has been described with reference to specific exemplary embodiments. It will, however, be evident that various modifications and changes may be made without departing from the broader spirit and scope of the invention as set forth in the claims that follow. The specification and drawings are accordingly to be regarded as illustrative rather than restrictive. Other embodiments of the invention may be apparent to those skilled in the art from consideration of the specification and practice of the invention disclosed herein.

What is claimed is:

1. A security protection device, comprising:
a cover circuit board, at least one inner wiring layer being included within the cover circuit board;
a base circuit board, at least one inner wiring layer being included within the base circuit board; and
a security frame between the base circuit board and the cover circuit board, the security frame including an inner frame and an outer frame with the inner frame located inside the outer frame, and at least one electrically conductive wire located between the inner frame and the outer frame and wound around the inner frame to form at least one winding protection layer surrounding side surfaces of the inner frame,
wherein the cover circuit board, the security frame, and the base circuit board form an enclosure enclosing a security zone, and the at least one inner wiring layer within the cover circuit board, the at least one inner wiring layer within the base circuit board, and the at least one electrically conductive wire within the security frame are connectable to a security mechanism configured to detect an intrusion into the security zone.

2. The security protection device of claim 1, wherein the at least one inner wiring layer within the cover circuit board is configured to form at least one of an open circuit and a short circuit when the intrusion occurs through the cover circuit board, the at least one of an open circuit and a short circuit triggering the security mechanism.

3. The security protection device of claim 1, wherein the at least one inner wiring layer within the base circuit board is configured to form at least one of an open circuit and a short circuit when the intrusion occurs through the base circuit board, the at least one of an open circuit and a short circuit triggering the security mechanism.

4. The security protection device of claim 1, wherein the at least one electrically conductive wire within the security frame is configured to form at least one of an open circuit and a short circuit when the intrusion occurs through the security frame, the at least one of an open circuit and a short circuit triggering the security mechanism.

5. The security protection device of claim 1, wherein one or more of the at least one inner wiring layer within the cover circuit board, the at least one inner wiring layer within the base circuit board, and the at least one electrically conductive wire located between the inner frame and the outer frame are configured to include one or more wiring mesh layers.

6. The security protection device of claim 1, wherein the at least one electrically conductive wire include a terminal located on an inner side of the inner frame and connectable to the security mechanism.

7. The security protection device of claim 1, further comprising:
a plurality of connectors capable of connecting at least one of a terminal of the at least one inner wiring layer within the cover circuit board and a terminal of the at least one inner wiring layer within the base circuit board to the security mechanism.

8. The security protection device of claim 7, further comprising:
a plurality of channels located in inner portions of the inner frame, wherein each of the plurality of connectors is mounted in each of the plurality of channels.

9. The security protection device of claim 7, wherein at least one of the plurality of connectors is configured to form an open circuit when the at least one of the plurality of connectors is loosened by uncovering either the cover circuit board or the base circuit board, the open circuit triggering the security mechanism.

10. The security protection device of claim 7, wherein the at least one winding protection layer surrounding side surfaces of the inner frame is configured to form at least one of an open circuit and a short circuit when an attack occurs to any of the plurality of connectors through the at least one winding protection layer, the at least one of an open circuit and a short circuit triggering the security mechanism.

11. The security protection device of claim 1, wherein the security mechanism comprises:
at least one intrusion detection circuit configured to detect the intrusion into the security zone, the security mechanism being triggered when the intrusion is detected; and
a self-destruct mechanism configured to destroy and/or erase data stored in an electronic component mounted within the security zone when the security mechanism is triggered.

12. The security protection device of claim 11, wherein the at least one intrusion detection circuit is configured to:
detect the intrusion by detecting, in an electrical connection, at least one of an open circuit and a short circuit caused by the intrusion, wherein the electrical connection is between the security mechanism and a terminal of the at least one inner wiring layer within the cover circuit board.

13. The security protection device of claim 11, wherein the at least one intrusion detection circuit is configured to:
detect the intrusion by detecting, in an electrical connection, at least one of an open circuit and a short circuit caused by the intrusion, wherein the electrical connection is between the security mechanism and a terminal of the at least one inner wiring layer within the base circuit board.

14. The security protection device of claim 11, wherein the at least one intrusion detection circuit is configured to:
detect the intrusion by detecting, in an electrical connection, at least one of an open circuit and a short circuit caused by the intrusion, wherein the electrical connection is between the security mechanism and a terminal of the at least one electrically conductive wire within the security frame.

* * * * *